Sept. 29, 1936.  B. RIDGEWAY  2,055,671

TRANSMISSION

Filed Oct. 17, 1932  7 Sheets-Sheet 6

Sept. 29, 1936.  B. RIDGEWAY  2,055,671

TRANSMISSION

Filed Oct. 17, 1932    7 Sheets-Sheet 7

Inventor:
Bruce Ridgeway.
By Dyrenforth, Lee, Chritton & Wiles
Attys.

Patented Sept. 29, 1936

2,055,671

UNITED STATES PATENT OFFICE 2,055,671

TRANSMISSION

Bruce Ridgeway, Mexico, Mo., assignor to Mexico Auto Parts, Inc., Mexico, Mo., a corporation of Missouri Application October 17, 1932, Serial No. 638,199

23 Claims. (Cl. 74—337)

This invention relates to transmissions for automobiles and the like and more particularly to automatic transmissions. The present application represents an improvement upon my copending application Serial No. 610,525, for Transmissions.

A primary object of the invention is to provide an improved variable-speed transmission which will automatically shift the gears in accordance with the load placed upon the driven shaft. Other objects are to provide a positive gear drive, a free wheeling control device, a control for preventing reverse movement of the car when on an incline, and other specific features which will appear as the specification proceeds.

The invention is illustrated, in a preferred embodiment, by the accompanying drawings, in which—

In the illustration given, A designates a drive shaft connected to the motor or any other suitable source of power; B designates a driven shaft, the forward end of the driven shaft being received in a recess in the drive shaft A; C designates an auxiliary or jack shaft; and D designates a reversing shaft.

The shafts A, B, C and D are mounted in a conventional manner in a casing I which is of general conventional design. The casing is provided at its top with a removable plate Iª in which are mounted shiftable levers which will be described in detail hereinafter.

Figures 13, 14, 15:
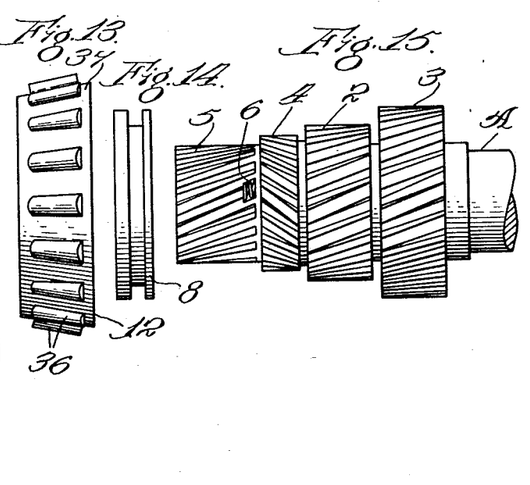
Fig. 13, a view in elevation of the other cooperating clutch member.
Fig. 14, a view in elevation of a shifting collar.
Fig. 15, a view in elevation of gear and spline members carried by the driving shaft.
Figure 16:
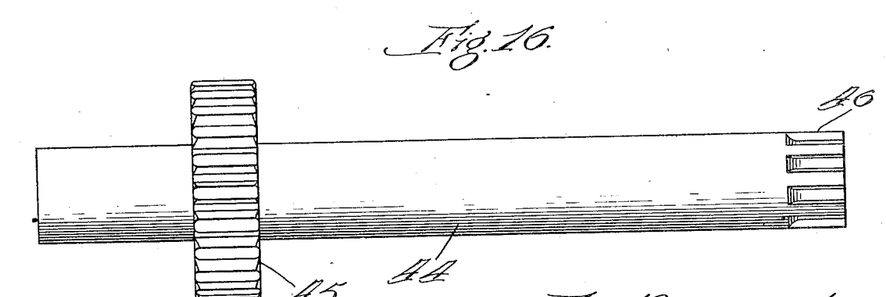
Fig. 16, a view in elevation of the auxiliary or jack shaft.
Figures 17, 18:
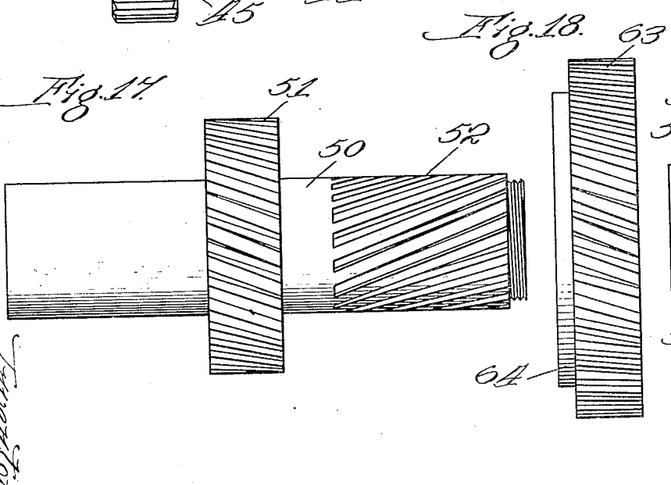
Fig. 17, a view in elevation of a sleeve gear-equipped member adapted to be received by the auxiliary shaft.
Fig. 18, a view in elevation of one of the clutch members.
Figure 19:
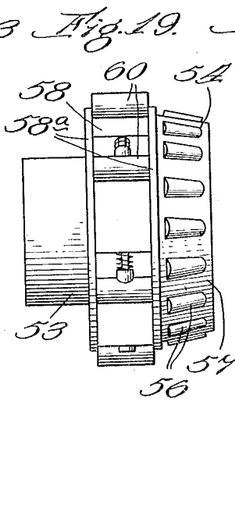
Fig. 19, a view in elevation of the inner clutch members.
Figure 20:
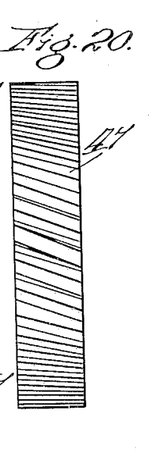
Fig. 20, a view in elevation of one of the outer clutch members.
Figures 22, 23, 24:
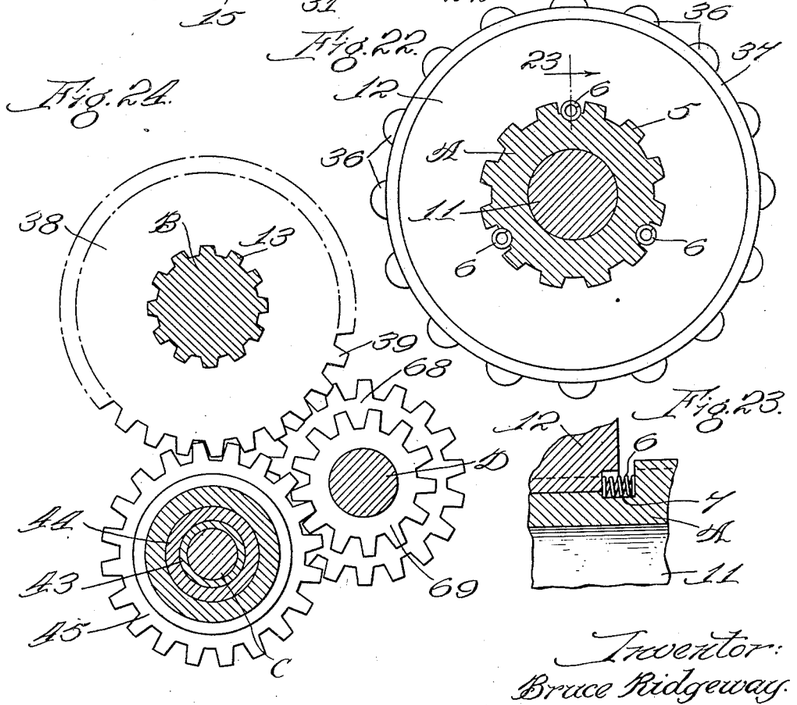
Fig. 22, a transverse sectional view, the section being taken as indicated at line 22 of Fig. 21.
Fig. 23, a detail sectional view, the section being taken as indicated at line 23 of Fig. 22.
Fig. 24, a transverse sectional view, the section being taken as indicated at line 24 of Fig. 1.

The drive shaft A extends through a cylindrical bearing Iᵇ, with which the casing A is provided, and carries on its inner side a low-speed gear 2 and a second-speed gear 3, both of which are integrally formed with shaft A. On the inner side of gear 2, the shaft A is provided with spiral splines 4. The reduced inner end of shaft A is also provided with spiral splines 5, which, however, run in a direction opposed to the direction of splines 4. As shown more clearly in Figs. 15, 22 and 23, short compression springs 6 are housed in recesses 7 within the reduced inner end of the shaft. The purpose of the springs will be later shown. The splines 4 are engaged by corresponding grooves in a shiftable collar 8 which is controlled by a shifting yoke 9. Shaft A is recessed at 10 to receive a reduced inner end 11 of the driven shaft B. The splines 5 of shaft A are engaged by corresponding grooves in a shiftable inner clutch member 12 which will be described in greater detail hereinafter.

The driven shaft B is supported in a bearing Iᶜ with which the opposite end of the casing I is provided. It is preferably equipped with longitudinal splines 13, a reduced portion 14 adjacent the splines, and a still further reduced end portion 11, the end 11 being received within the recess 10 of drive shaft A. Mounted upon the reduced portion 14 of shaft B are members providing a torque-controlled clutch mechanism adapted to cooperate with the inner clutch member 12 on shaft A.

Figure 1:
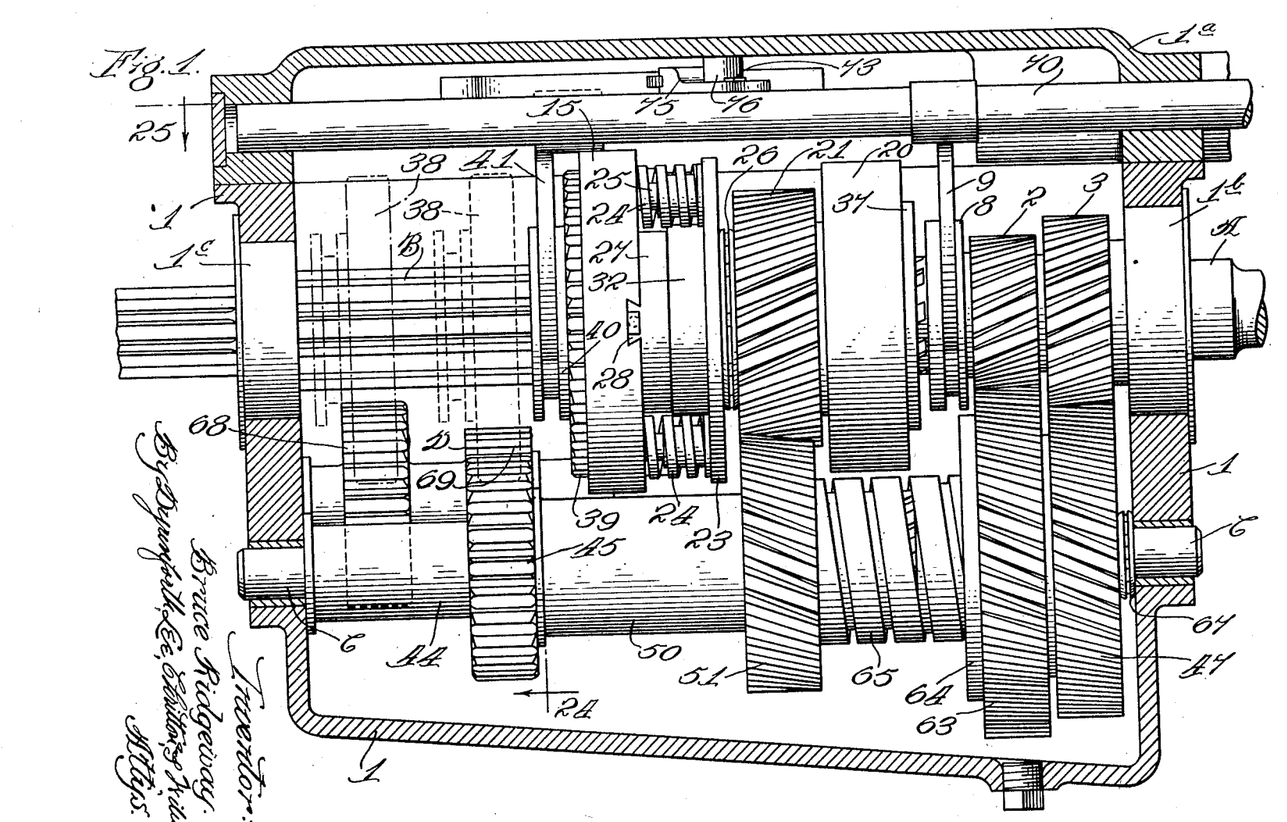
Fig. 1 is a side view in elevation of a transmission embodying my invention.
Figure 2:
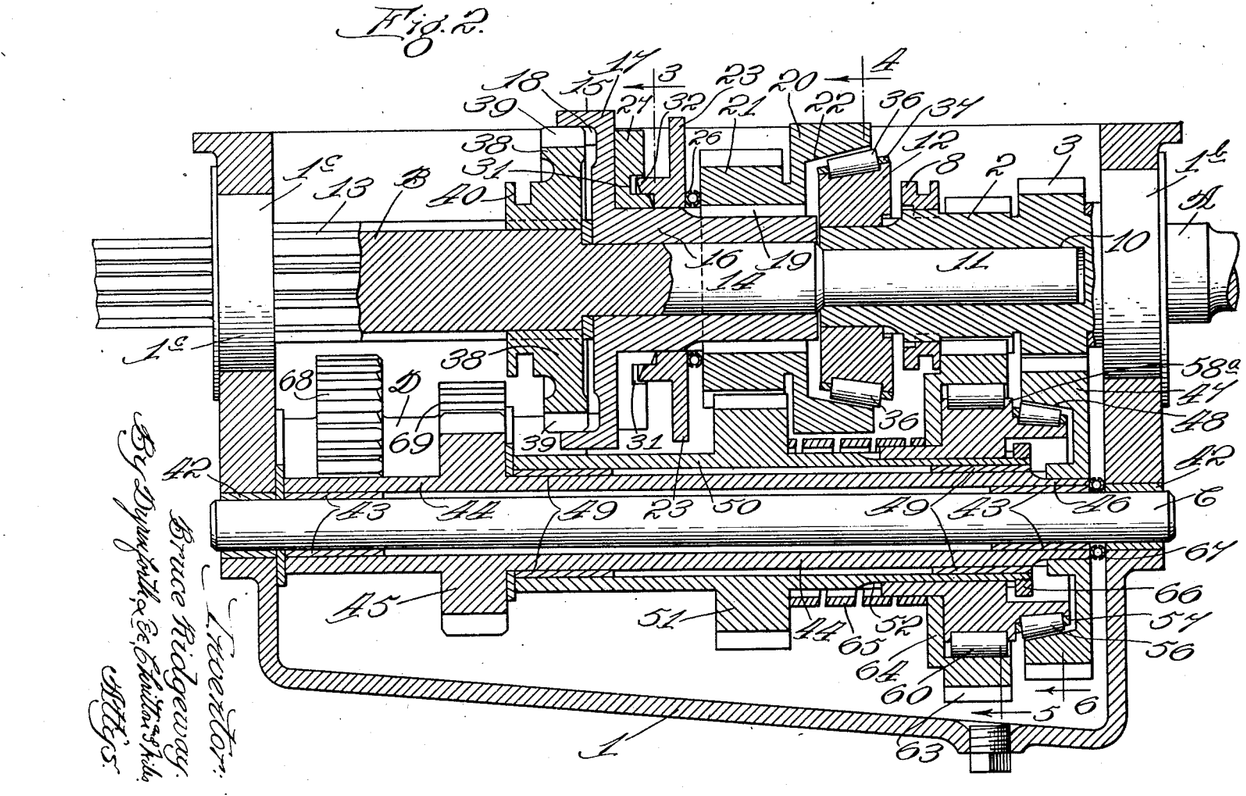
Fig. 2, a broken longitudinal and part sectional view.
Figure 3:
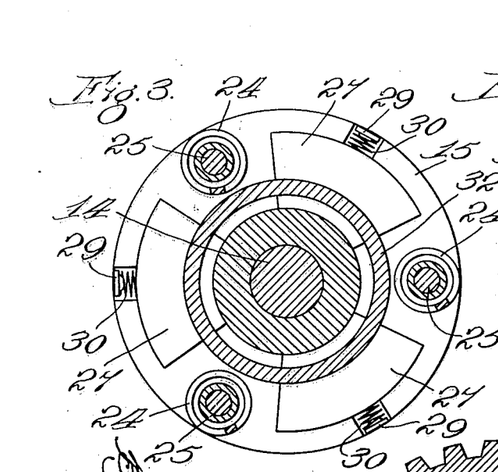
Fig. 3, a detail sectional view, the section being taken as indicated at line 3 of Fig. 2.

The torque or load-controlled mechanism on shaft B will now be described. A member 15, as shown more clearly in Fig. 2, is provided with a hub portion 16 encircling the portion 14 of shaft B and with an integral cylindrical portion 17 provided interiorly with clutch teeth 18. Near its forward end, the hub 16 is provided with curvilinear splines 19. An outer clutch member 20 is provided with an integral hollow gear 21 provided internally with curvilinear splines meshing with the splines 19 of the member 15. The forward portion of the clutch member 20 is substantially cylindrical and provides on its inner side an inclined wall 22. Between the member 15 and the member 20 is interposed a ring member 23 which is urged in the direction of the member 20 by compression springs 24 carried by pins 25 secured to the member 15. As shown more clearly in Figs. 1 and 3, the compression springs 24 are three in number and are positioned at spaced points about the forward face of the member 15. If desired, a thrust ball bearing 26 may be interposed between the ring 23 and gear 21.

The member 15 is also shown provided with automatic means for locking the clutch members in high-speed position. As shown more clearly in Figs. 1, 2 and 3, slidable block members 27 are equipped with integral dove-tail lugs 28 which engage correspondingly shaped grooves in the member 15. A pin 29 which is secured to the member 15 supports a compression spring 30 which urges the block 27 inwardly. As shown more clearly in Fig. 2, the block 27 is provided on its forward face with a groove 31. The groove 31, when the block is in the position of rest, as shown in Fig. 2, receives an annular ledge 32 integrally formed with the ring 23. When, however, the blocks 27 are thrown outwardly by centrifugal force, the groove 31 is no longer in alignment with the projection 32 and the ring 23 is held in forward position, as shown more clearly in Fig. 21. The projection 32 is preferably provided with a beveled face 33 which contacts a similarly beveled face 34 on the portion of the block 27 below groove 31, as shown more clearly in Fig. 21. This construction enables the parts to slide quickly back into the position at rest, as shown in Fig. 2, when the speed is reduced below a predetermined point.

The inner clutch member 12 is provided on its outer surface with an inclined wall which is substantially parallel with the wall 22 of member 20. In addition, the outer wall of the member 12 is provided with cams 35 which are in the shape of alternate ridges, the inclinations running in both directions. Supported against the cams 35 are conical rollers 36 which are held in position by a slotted conical ring 37.

In order to lock the load-controlled clutch mechanism to the driven shaft B, I provide a shiftable gear member 38 provided externally with teeth 39 which engage the internal teeth 18 of the member 15. Integrally formed with the gear 38 is a grooved extension 40 adapted to receive the yoke 41. The member 38 is provided interiorly with grooves receiving the longitudinal splines 13 of the driven shaft B.

The auxiliary or jack shaft C, together with the gear and clutch mechanism mounted thereon, will next be described. The shaft C, as shown more clearly in Fig. 2, is mounted within bearings 42 at opposite ends of the casing. Mounted upon bearings 43, which extend about shaft C, is a hollow sleeve 44. Integrally formed with sleeve 44 near its rear is a gear 45 for the purpose of permitting a positive gear drive. The sleeve 44 at its forward end is provided with straight splines 46 which engage corresponding grooves in the second-speed gear 47. It will be observed that the gear 47, which meshes with the gear 3 on shaft A, is thus directly connected with the gear 45 formed integrally with sleeve 44. The gear 47 is provided on its inner side with an inclined wall 48 which serves as a gripping wall for the roller-clutch mechanism which will be described later.

Figures 4, 6:
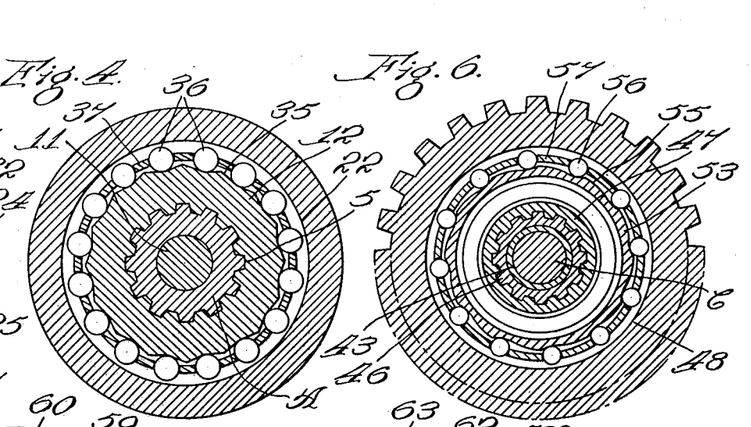
Fig. 4, a detail sectional view, the section being taken as indicated at line 4 of Fig. 2.
Fig. 6, a detail sectional view, the section being taken as indicated at line 6 of Fig. 2.
Figures 5, 7:
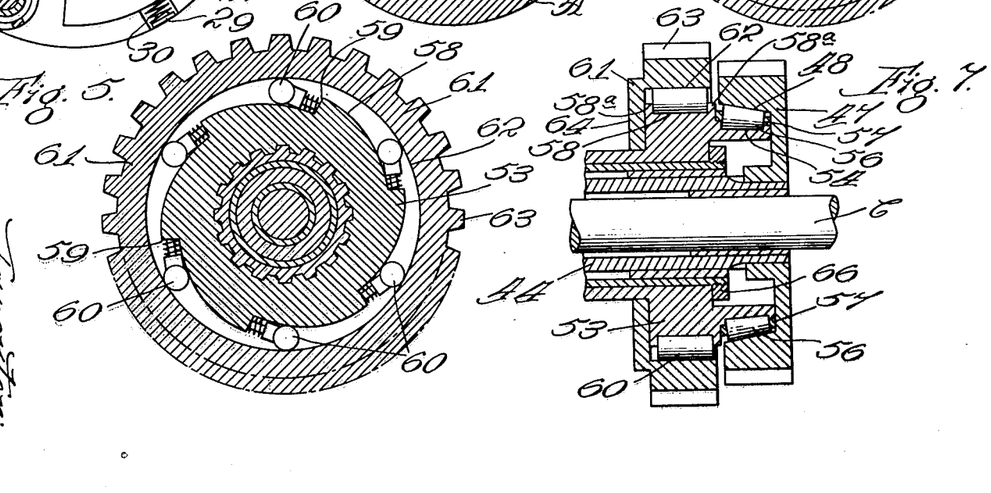
Fig. 5, a detail sectional view, the section being taken as indicated at line 5 of Fig. 2.
Fig. 7, a broken longitudinal sectional view of the clutch mechanism employed on the auxiliary or jack shaft, the mechanism being shown in second-speed position.
Figure 8:
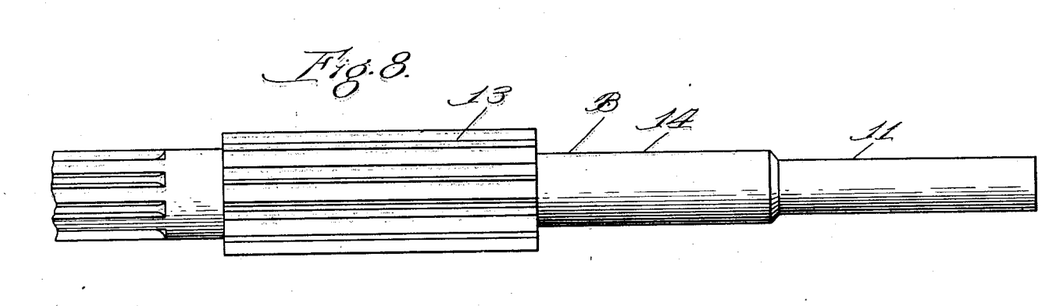
Fig. 8, a broken side view of the driven shaft.
Figures 9, 10, 11:
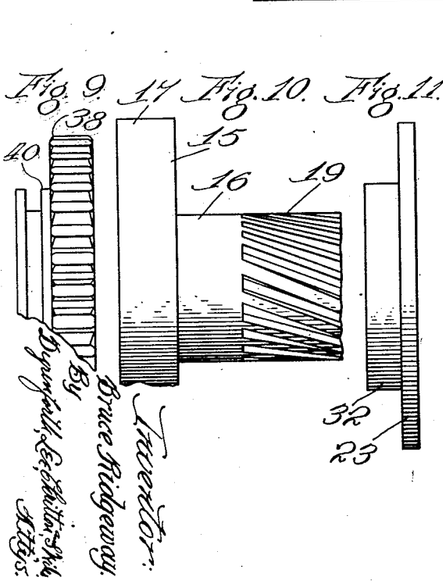
Fig. 9, a view in elevation of the shiftable connecting gear.
Fig. 10, a broken view in elevation of a spline-equipped member received on the driven shaft and adapted to be engaged by the connector gear.
Fig. 11, a view in elevation of a sliding collar.
Figure 12:
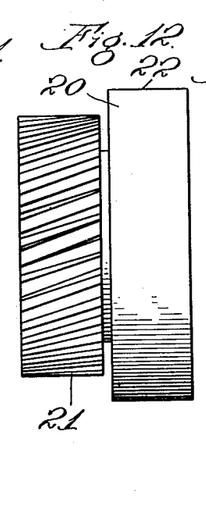
Fig. 12, a view in elevation of one of the clutch members.

Mounted upon bearings 49 is a second sleeve member 50 which carries an integral gear 51 meshing with gear 21 of shaft B. At its forward end, the sleeve 50 is provided with curvilinear splines 52 which mesh with grooves in the inner clutch member 53. The inner clutch member 53, as shown more clearly in Figs. 5, 6, 7 and 19, is provided with two cam surfaces. The forward cam surface 54 is conical in shape and substantially parallel with the inclined surface 48 of the member 47. The members 55 thereon are shaped as illustrated in Fig. 6. Rollers 56 are supported against the cam surfaces by means of a slotted ring 57. The cams permit the outer member 47 to override when turning against the steep pitch of the cam surfaces, but tend to lock the member 47 to the inner clutch member 53 when the rollers are directed against the less sharp cam inclinations. The cam surfaces 58, as illustrated more clearly in Fig. 5, are somewhat of the conventional free wheeling type having notches or enlargements 59 alternating with the inclinations. As shown more clearly in Figs. 7 and 19, the cam surfaces 58 are recessed centrally to provide lateral flanges 58ª which retain the rollers 60 in position. Within the enlargements 59 are spring-urged rollers 60 which permit the overrunning of the members when the rollers are urged toward the enlargements, but lock the two parts together when the rollers are urged toward the constricted areas. The enlargements and constricted areas are afforded by an outer clutch member or low-speed gear 61 which provides a wall 62 opposed to the cam wall 58 of the inner clutch member 53. The outer clutch member 61 is provided on its periphery with teeth 63 which engage gear 2 on shaft A. Gears 2 and 63 provide the drive in low speed while gears 3 and 47 provide the second-speed drive. The outer clutch member 61 is provided with an inwardly extending flange 64. A compression spring 65, as shown more clearly in Fig. 1, is mounted between gear 51 and the flange 64 of the clutch member 61. In order to lock the inner clutch member 53 to the sleeve 50, I employ a nut 66 which engages the threaded forward end of sleeve 50. If desired, a thrust roller bearing 67 may be interposed between the sleeve 44 and the casing 1.

The reverse shaft D may be employed for driving the car in reverse. It is provided with a gear 68 adapted to be brought in mesh with teeth 39 of slidable gear 38, as shown more clearly in Fig. 24. The shaft D is also provided with a pinion 69 which meshes directly with gear 45 on shaft C. The pinion 69 is too short to be engaged by the shiftable gear 38, the latter gear meshing only with the positive drive gear 45 on shaft C and the reversing gear 68 on shaft D.

Figure 25:
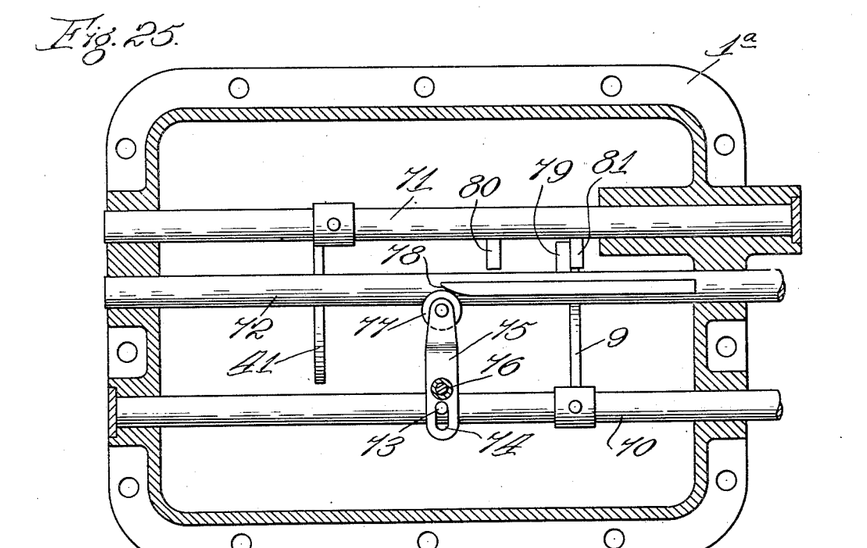
Fig. 25, a plan sectional view, the section being taken as indicated at line 25 of Fig. 1.
Figure 26:
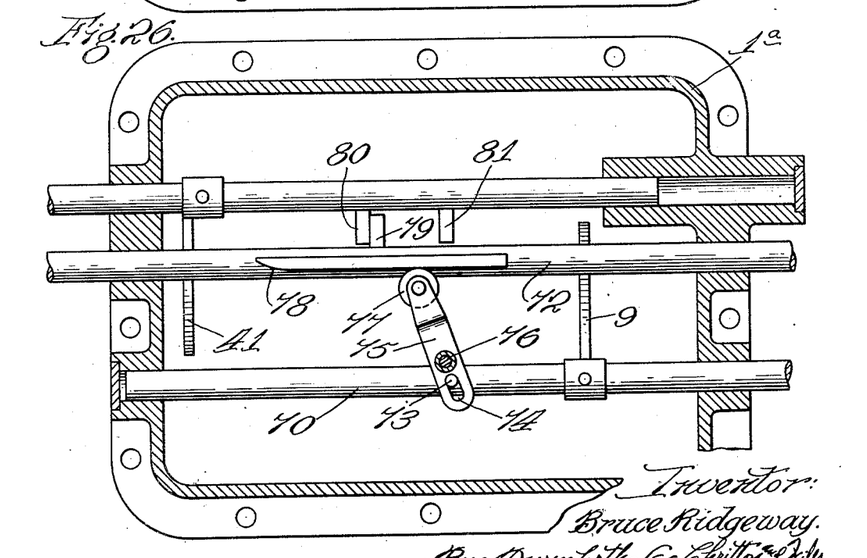
Fig. 26, a view similar to Fig. 5, but showing the shifting levers in a different position.

In Figs. 25 and 26, as well as in Fig. 1, shifting mechanism is illustrated by which the collars 8 and 40 may be actuated. The yoke 9 is secured to the shiftably mounted rod 70 and yoke 41 is secured to the shiftable rod 71. Intermediate rods 70 and 71 is a third shiftable rod 75

72. Rods 70 and 72 extend outside of the plate 1ᵃ and may be actuated by suitable levers or draw buttons (not shown) located on the dashboard of the car. The rod 70 is provided with a pin 73 adapted to engage a slot 74 in a lever member 75. The lever 75 is pivoted to the casing 1 at 76. The lever 75 is preferably provided at one end with a roller 77 adapted to be engaged by an inclined cam 78 carried by the rod 72. The rod 72 is also provided with a lug 79 which extends between spaced lugs 80 and 81 on the rod 71. With the construction illustrated, the yoke 9 will be shifted necesarily to the position illustrated in Fig. 2, when the rod 72 is shifted to the rearward position shown in Fig. 26. The purpose of this will now be described in connection with the operation of the mechanism.

Operation

Assuming that it is desired to move the car forward at progressively increasing speeds, the shift rod 72 is drawn forward so that the lug 79 engages lug 81 on rod 71. The yoke 41 is thus moved forward carrying with it the connecting gear 38 so that teeth 39 of gear 38 mesh with teeth 18 of the member 15 (Fig. 2). The automatic clutch mechanism on the driven shaft is now connected to shaft B. Also, the outer clutch member 20 on shaft B is connected by the rollers 36 and cams 35 to the inner clutch member 12 on the drive shaft A, the compression springs 24 urging the member 20 against the inner clutch member 12. As the shaft A is rotated for forward movement, the member 20, due to the heavy load on the driven shaft B, tends to recede from the inner clutch member 12, the intermeshing curvilinear splines 19 between it and the member 15 causing the member 20 to pull itself rearwardly along the hub 16 and compressing the springs 24. As the member 20 moves rearwardly, the rollers 36 roll up the cam surfaces 35 and drop into the valleys in which position the outer and inner clutch members are free.

With the clutch members on the main shafts free, the next movement is the freeing of the inner clutch member 53 from the second-speed gear 47. Because the gear 47 is driven more rapidly by gear 3 than the low-speed gear 63, it is necessary first to free gear 47 before the drive can proceed with the low-speed gear. The action here is substantially the same as that described in connection with clutch members 12 and 20. Because of the heavy load on the driven shaft, the member 53 screws itself rearwardly along the curvilinear splines 52 against the compression spring 65. This movement permits the rollers 56 to roll over the cam inclinations and to drop into the recesses or valleys in which position the second-speed gear 47 is free to overrun.

The drive now proceeds through the low-speed gears 2 and 63. It will be understood, of course, that the separation or freeing of the clutches on the main shaft and the second-speed clutch members takes place almost instantaneously at the first movement of the drive shaft A so that the car starts out in first gear almost as soon as the drive shaft A begins to rotate. In the drive through the low-speed gears 2 and 63, the rollers 60 are drawn toward the constricted portions of the chambers and thus lock the low-speed gear to the inner clutch member 53. The sleeve member 50, which is connected to the inner clutch member 53 by means of splines 52, is caused to rotate with the low-speed gear and the gear 51 on sleeve 50 drives gear 21 on the driven shaft B. As the car gathers speed and the load on the driven shaft decreases, the compression spring 65 tends to shift the clutch member 53 forwardly along the curved splines until the conical rollers 56 again are gripped between the cams 55 and the inner wall 48 of the second-speed gear. The tension of the spring 65 and the pitch of the spiral splines 52 are so co-ordinated that the inner clutch member will be shifted forwardly as soon as the load on the driven shaft decreases below a predetermined point.

When the conical rollers 56 connect the inner clutch member 53 to the second-speed gear 47, as just described, the drive proceeds through gears 3, 47, 51 and 21. The rollers 60, being now driven toward the enlargements 59, free the inner clutch member 53 from the low-speed gear so that the low-speed gear idles as the drive proceeds through the second-speed gear.

When the load on the driven shaft B drops still further, the compression springs 24 urge the ring 23 and thereby the outer clutch member 20 in a forward direction. The compressive strength of the springs 24 is co-ordinated with the pitch of the splines 19 so as to shift the outer clutch 25 forward as soon as the load on shaft B drops below the predetermined point. As the inclined wall 22 of the outer clutch 20 is advanced, the conical rollers 36 again bind between the cam surfaces 35 and wall 22, thus locking the inner and outer clutch members and thereby the driving and driven shafts. There is now a direct drive and the rotation of the inner clutch member 53 by means of gears 21 and 51 at a more rapid speed than the low-speed and second-speed gears causes the low and second-speed gears to idle, the rollers 60 and 56 being urged in the direction of the enlargements.

Figure 21:
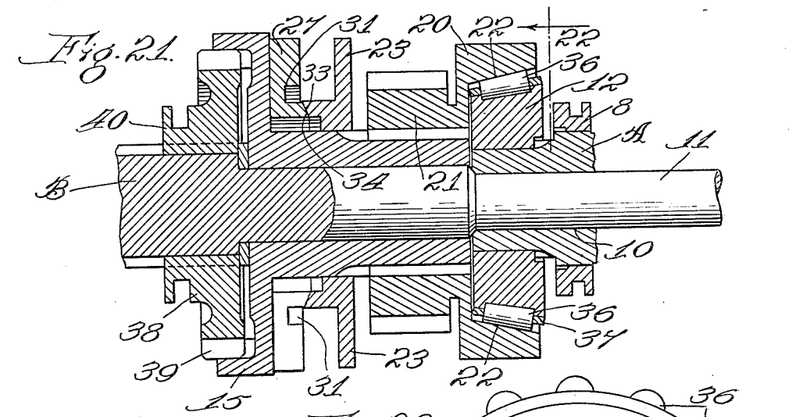
Fig. 21, a longitudinal broken sectional view of the driving and driven shafts with the clutch mechanism thereon connected in high-speed position.

As the main shafts rotate in high speed, the slidable blocks 27 are thrown outwardly against the force of spring 30 to the position illustrated in Fig. 21, the ring member 23 having already been urged into the forward position by compression springs 24. The abutting cam surfaces 33 on ring member 23 and 34 on the slidable members 27 tend to lock the ring 23 and the outer clutch member 20 in forward position. By this means, the high-speed relation of the clutch members is maintained in spite of slight irregularities in speed until the speed of rotation of the driven shaft B drops definitely below a certain point, in which event the locking members 27 are drawn back to the position shown in Fig. 2 by the springs 30. The cam surfaces 33 and 34 facilitate the return of the parts to the position shown in Fig. 2. With the locking members 27 back in the position of rest, the ring 23 and outer clutch member 20 are free to slide back to the free position illustrated in Fig. 2.

In order to permit free wheeling or the overrunning of the member 20 when it is driven faster than the inner clutch member 12, I have provided the inner end of shaft A with curved splines 5 and with short compression springs 6. When the speed of rotation of the member 20 exceeds that of the member 12, the member 12 tends to screw forwardly on splines 5 against the springs 6 so as to separate the conical rollers 36 from contact with the wall 22 of the outer clutch member. This permits the outer clutch member to ride freely over the inner clutch member. When, however, the speed of shaft A is accelerated, the curved splines throw the inner clutch member 12 rearwardly again so as to bring the rollers 36 into gripping contact with the cams 35 and wall 22, thus locking the clutch members together. In order to lock the clutch members out of free wheeling, if this be desired, I provide a shiftable collar 8 which is secured by splines 4 to shaft A. It will be noted that the splines 4 are angularly disposed with respect to splines 5. If the collar 8 is shifted rearwardly, it will confine the inner clutch member 12 in its extreme rearward position so as to prevent longitudinal shifting thereof. The collar 8 is shifted by means of yoke 9 secured to shaft 78.

In returning from the high-speed drive to the low-speed drive, the reverse of the operations heretofore described takes place. As the load on the driven shaft increases, the outer clutch member 20 screws rearwardly along splines 19 until rollers 36 clear the cams 35 and the clutch members are free. The drive then proceeds through the second-speed gears 3 and 47 and through gears 51 and 21. As the load on the driven shaft increases further, the inner clutch 53 screws rearwardly along splines 52 and against the compression spring 65 until the rollers 56 clear the cams 55. The drive then proceeds through low gears 2 and 63 and through gears 51 and 21.

If a positive gear drive is desired, the connector gear 38 may be shifted rearwardly into engagement with the gear 45 which is formed integrally with shaft 44. This is done by moving the shift rod 72 rearwardly so that the lug 79 strikes the lug 80 of rod 71. The yoke 41 is thus moved to the rear so as to carry the member 38 to the first rear position shown in dotted lines in Fig. 1. The drive then proceeds through gear 3, second-speed gear 47, sleeve 44, gear 45 and the connector gear 38. It will be noted that the automatic clutch mechanism is no longer connected to the driven shaft and that the second-speed gears are now connected positively with the driven shaft.

To drive the car in reverse, the rod 72 is shifted still further to the rear so that the shift rod 71, by means of the yoke 41, carries the connector gear 38 to the rearmost position shown in dotted lines in Fig. 1. The gear 38 is thus brought into mesh with the reversing gear 68. The drive now proceeds through gear 3, gear 47, sleeve 44, gear 45, pinion 69, shaft D, gear 68, and connector gear 38. Before disengaging connector gear 38, I prefer to shift the collar 8 automatically to the forward position in order to facilitate the disengaging operation.

As the rod 72 is shifted rearwardly, the cam 78 strikes the roller 77 and moves the lever 75 to the position shown in Fig. 26. The slot 74 engages pin 73 and shifts the rod 70 to the forward position illustrated.

If it is desired to prevent the car from backing down an incline, the yoke 8 may be shifted rearwardly to lock the inner clutch 12 out of free wheeling. Assuming that the connector gear 38 is connected to the member 15, as shown in Fig. 21, the rotation of the outer clutch member 20, as would be necessary for rearward movement of the car, would roll the rollers 36 (Fig. 4) up the inclines and cause it to grip the inner clutch 12 to the outer clutch 20. The different speed gears would then cooperate with the interlocked clutch members to prevent rotation of driven shaft B. As stated above, this no-back feature is automatically eliminated, when the shift rods are manipulated for reverse movement.

While I have shown the principles of my automatic clutch mechanism in the specific embodiment illustrated in the drawings, it will be understood that the same principles may be employed in the widely different embodiments and combinations without departing from my invention. The foregoing detailed description has been given for clearness of understanding only, and no unnecessary limitations should be understood therefrom, but the appended claims should be construed as broadly as permissible, in view of the prior art.

I claim:

1. In combination with a transmission having aligned driving and driven shafts and a chain of gears connecting said shafts, automatic clutch mechanism on said aligned shafts and comprising cooperating clutch members secured thereto, each of said clutch members being slidably mounted on said shafts and having curved spline connections therewith, and spring means cooperating with said clutch members to connect said aligned shafts when the load on the driven shaft is reduced to a predetermined point.

2. In combination with a transmission having main driving and driven shafts and a chain of gears connecting said shafts, automatic clutch mechanism comprising cooperating clutch members slidably secured by splines to said shafts, said spline connections being curved, said clutch members affording opposed gripping and cam walls, gripping rollers between said walls, and spring means cooperating with said clutch members and splines to connect said shafts when the load on the driven shaft is reduced to a predetermined point.

3. In combination with a transmission having aligned driving and driven shafts and a chain of gears connecting said shafts, cooperating clutch members on said shafts, one of the clutch members being slidably mounted and secured by curved spline connections to its shaft, said clutch members providing between them an opposed inclined gripping and cam wall, an inclined ring encircling one of said clutch members and provided with spaced slots, and conical rollers mounted within said slots.

4. In combination with a transmission having aligned driving and driven shafts and a chain of gears connecting said shafts, cooperating clutch members splined to and slidably mounted on said shafts, the splines being curved, spring means connecting said clutch members when a load on the driven shaft falls below a predetermined point, and shiftable means for locking one of said clutch members in a fixed position on its shaft.

5. In combination with a transmission having aligned driving and driven shafts, clutch mechanism on the shafts and comprising an outer clutch member slidably secured to one shaft and providing an inner gripping wall, the other clutch member being provided with cams and rollers adapted to grip said wall and to lock the two clutch members together, said second-mentioned clutch member being slidably secured to one of said shafts, and slidable means splined to said last-mentioned shaft and adapted to lock said second-mentioned clutch member in a position adjacent said gripping wall.

6. In combination with a transmission having aligned driving and driven shafts, an auxiliary shaft, a sleeve member about said auxiliary shaft, gears carried by said sleeve member, shiftable gear means for connecting one of said gears to said driven shaft, a gear connecting said other gear to the driving shaft, a second sleeve member about said first sleeve member and equipped with a gear, a gear carried by said driven shaft and engaging said last-mentioned gear, and automatic clutch mechanism between members associated with said sleeves and permitting said sleeve members to rotate independently in accordance with the load placed on the driven shaft.

7. In combination with a transmission having aligned driving and driven shafts, an auxiliary shaft, and connecting gears between the auxiliary shaft and the driving and driven shafts, means connecting said last-mentioned gears to said driving and driven shafts to provide a positive gear drive, a rotatable sleeve member carried by said auxiliary shaft and carrying a gear, a gear connecting said last-mentioned gear to the driven shaft, automatic clutch members connecting said sleeve to members carried by said auxiliary shaft, and spring means adapted to shift one of the clutch members along said sleeve.

8. In combination with a transmission having driving and driven shafts and connecting gears between said shafts, automatic clutch mechanism on said aligned shafts comprising a clutch member splined to one of said shafts, said spline connection being curved, and a cooperating clutch member slidably splined to the other shaft, spring means cooperating with said clutch members and splines to connect said shafts when the load on the driven shaft is reduced to a predetermined point, slidable locking members associated with said clutch mechanism adapted to lock said shafts in connected relation as long as said aligned shafts are rotated above a predetermined rate, and means associated with said locking members for guiding said members back into unlocking position.

9. In combination with a transmission having aligned driving and driven shafts and connecting gears therebetween, automatic clutch mechanism on said aligned shafts comprising a clutch member splined to one of said shafts, said spline connection being curved, a cooperating clutch member slidably splined to the other shaft, a shiftable ring member adjacent said last mentioned clutch member, spring means cooperating with said clutch members and first-mentioned splines to connect said aligned shafts when the load on the driven shaft is reduced to a predetermined point, and slidable locking members adapted to engage said slidable ring member and to lock it in one position as long as said driven shaft is rotated above a predetermined rate, said ring and said locking members being provided with inclined surfaces adapted to be brought into sliding contact.

10. In combination with a transmission having aligned driving and driven shafts, an auxiliary shaft, variable speed gears connecting said auxiliary shaft and said aligned shafts, clutch members splined to said aligned shafts and to said auxiliary shaft and cooperating with said gears to connect and disconnect said gears in accordance with the load on the driven shaft, said splines being curved, said clutch members comprising at least one slidable member and the clutch members providing between them opposed cam and gripping walls, said walls being inclined, conical rollers secured between said cam and gripping walls, and spring means so tensioned as to shift said slidable clutch member into engagement with the other clutch member when the load on the driven shaft drops below a predetermined point.

11. In combination with a transmission having aligned driving and driven shafts, an auxiliary shaft, gears connecting said driving, auxiliary and driven shafts, clutch mechanism on said driving and driven shafts and comprising a clutch member slidably secured to one of said shafts and a cooperating clutch member slidably secured to the other shaft by curved splines, shiftable means for locking one of said clutch members upon its shaft, a reversing gear carried by a third shaft, connecting gears between said auxiliary shaft and said reversing gear and between the reversing gear and the driven shaft, means for shifting the gear between said reversing gear and said driven shaft, and means associated with said last mentioned means for simultaneously shifting said first mentioned shiftable means.

12. In combination with a transmission having aligned driving and driven shafts, an auxiliary shaft, a sleeve member about said auxiliary shaft, gears carried by said sleeve member, shiftable gear means for connecting one of said gears to said driven shaft, a gear connecting said other gear to the driving shaft, a second sleeve about said first sleeve member and equipped with a gear, a gear carried by said driven shaft and engaging said last mentioned gear, automatic clutch mechanism on said aligned shafts, and automatic clutch mechanism between members associated with said sleeves and permitting said sleeve members to rotate independently in accordance with the load placed on the driven shaft.

13. In combination with aligned driving and driven shafts, curved splines secured to each of said shafts and in adjacent relation to each other, and means slidably mounted on the curved splines of said shafts for connecting said driving and driven shafts.

14. In combination with aligned driving and driven shafts, curved splines secured to each of said shafts and in adjacent relation to each other, and means slidably mounted on the curved splines of said shafts for connecting said driving and driven shafts, said curved splines on one shaft running in a different direction from those on the other shaft.

15. In combination with aligned driving and driven shafts, curved splines secured to each of said shafts and in adjacent relation to each other, and slidably mounted members carried by said splines and adapted to be brought into frictional engagement, said last-mentioned members eventually engaging each other to connect the driving and driven shafts.

16. In combination with aligned driving and driven shafts, curved splines secured to each of said shafts and in adjacent relation to each other, and slidably mounted means carried by said splines and adapted to be brought into frictional engagement to equalize the speeds of the shafts and then for releasably connecting the two shafts.

17. In combination with a transmission having aligned driving and driven shafts, overrunning clutch mechanism comprising one clutch member slidably secured to one of the shafts and a cooperating clutch member slidably secured by spiral splines to the other shaft to allow longitudinal movement thereon under torque, spring means urging the slidable clutch member into connection with the other clutch member, and speed-responsive means adapted to lock said clutch members in connected relation when the speed of the aligned shafts exceeds a predetermined rate, said speed-responsive means for said clutch members being provided with means for exerting pressure against said clutch members tending to shift the same when said speed-responsive means are actuated by increased speed.

18. In combination with a transmission having aligned driving and driven shafts, overrunning clutch mechanism comprising cooperating and slidably related clutch members on said shafts, torque-responsive means for bringing said clutch members into engagement, and speed-responsive means maintaining said clutch members in connected relation when the speed of the aligned shafts exceeds a predetermined rate, said speed-responsive means and said clutch members being provided with cooperating means for exerting pressure against said clutch members tending to shift the same when the speed-responsive means is actuated by increased speed.

19. In an automatic gear shift for automobiles, a driving and driven shaft, a two part clutch for connecting the same for normal operation, both parts of said clutch being threaded on their respective shafts, a relatively stiff and a weaker spring for the said parts to hold the clutch parts in engagement, each part being threaded on its shaft in such a direction that the stiff spring is compressed to uncouple the clutch when the driving torque exceeds a predetermined amount, and the weak spring compressed and the clutch uncoupled when coasting.

20. In an automatic gear shift, for automotive vehicles, a driving and a driven shaft, a friction grip type, two-part clutch connecting said shafts for direct drive, one part of which is axially movable to open and close said clutch, reduction gearing around said clutch for slow speed drive, including a gear which forms said movable part of said clutch, a one-way friction gear grip type clutch for rendering said slow speed drive inoperative when the direct drive is operating, and torque responsive means for automatically causing said axial opening movement of said gear-clutch part to throw out said clutch when the torque exceeds a predetermined amount.

21. An automatic gear shift for automotive vehicles as claimed in the preceding claim, in which said torque responsive means also automatically causes axial closing movement of such gear-clutch part to throw in said clutch when the torque falls below a predetermined amount.

22. In an automatic gear shift for automotive vehicles, the combination with a driving and a driven shaft, a two part friction grip type clutch for connecting said shafts, one of said parts being axially movable on said driven shaft to connect and disconnect said clutch, a reduced speed drive around said clutch including a gear threaded on said driven shaft and a part of which constitutes said movable part of said clutch so as to disconnect said clutch upon slippage between said gear and the drive shaft, and a spring for maintaining said clutch closed except when the torque transmitted through the threads is sufficient to overcome the force of the spring.

23. In an automatic change speed gear, a driving and a driven shaft, a two part clutch for connecting said shafts for direct drive, and reduction gearing around said clutch for slower speed drive, one of said gears being threaded on one of said shafts and constituting also one part of said two part clutch.

BRUCE RIDGEWAY.